United States Patent Office 2,829,985
Patented Apr. 8, 1958

2,829,985
PROCESS FOR RECOVERING SUGAR FROM NATURAL PRODUCTS CONTAINING IT

Georg Hingst, Bad Segeberg, and Werner Emte, Gelsenkirchen-Buer, Germany, assignors to Friedrich Uhde G. m. b. H., Dortmund, Germany, a corporation of Germany No Drawing. Application September 27, 1955
Serial No. 537,053

Claims priority, application Germany April 28, 1955

7 Claims. (Cl. 127—44)

The present invention relates to a process for recovering sugar from natural products containing it.

In German specification No. 596,091 is described a process for obtaining sugar from dried sugar-beet chips, in which the sugar is extracted from the chips by means of liquid ammonia. It is intended that the sugar should be recovered in a crystalline form in this process by evaporating the ammonia.

The process has the disadvantage that an extract is obtained, which remains viscous due to the very high concentration of sugar obtained by evaporating the ammonia, and from which the sugar can be crystallised only with great difficulty or from which the sugar is obtained as a tough hard mass. Recovery of the sugar from such an extract industrially is therefore beset with difficulties militating against its use in a continuous process, and this has hitherto prevented the process from being used.

The present invention is based on the observation that the great difficulty or impossibility of bringing about separation, and therefore recovering the sugar from a solution thereof in liquid ammonia, resides in the fact that the saccharose is not present as such in the solution, but is in the form of a compound of saccharose with ammonia. Compounds of this kind can be obtained in a well crystallised form, which are composed of 1 mol of saccharose and 2 mols of ammonia and even those of other compositions. The properties of these compounds account for the behaviour of sugar in solution in liquid ammonia.

The present invention provides a process which enables the sugar to be separated and recovered rapidly from such solutions in good yield and in a crystalline and practically pure form.

Accordingly, the invention provides a process for recovering sugar from natural products containing it, or from sugar-containing concentrates by extraction with liquid ammonia, wherein the ammonia extract, advantageously a concentrated extract, is mixed with an organic solvent to precipitate selectively the accompanying substances of high molecular weight, the latter substances are removed by a mechanical method, and the sugar or a compound of sugar and ammonia is separated from the solution so purified.

In carrying out the process a viscous extract is used, which is obtained by extracting sugar with liquid ammonia from a sugar-containing natural product, more especially sugar-beet chips, but also dates, figs, sugar cane, carob beans or a similar product, or by mixing with liquid ammonia a sugar-containing concentrate, such as molasses, a residue from the present process, raw sugar or the like. Crystalline and practically pure sugar is obtained from such an extract or mixture by first mixing the extract or mixture with a proportion of an organic solvent such that accompanying substances of high molecular weight, such as pectins, protein compounds, tannings, etc. are selectively precipitated and can be removed by mechanical methods, such as filtration, adsorption or centrifuging. The proportion of the solvent required to precipitate the accompanying substances of high molecular weight depends on the nature of the solvent and can easily be determined by a person skilled in the art by simple small-scale tests. By the mechanical removal of the said substances, there is obtained a largely purified solution of the extract, which solution is referred to hereinafter as a "filtrate," and from which pure sugar can be recovered in various ways.

One method of working up the filtrate consists, for example, in mixing the filtrate, free from tannins, etc., with a solvent or solvent mixture in which the sugar or sugar-ammonia compounds are substantially insoluble. In this manner the latter compounds can be precipitated directly, and then separated from the solvent. By precipitating the sugar-ammonia compounds almost pure sugar can be obtained by simple heating of the precipitated and, if desired, washed, compounds, whereby the ammonia is driven off.

Another method consists in removing the ammonia from the filtrate to a great extent, for example, by evaporation, during which the non-sugar substances remain in solution, the sugar-ammonia compounds progressively decompose, and the sugar precipitates. For this method methanol is especially advantageous as solvent, because, not only does it possess a good or sufficient solvent power with respect to non-sugar substances of low molecular weight, such as sugar imines or amino compounds, but it also dissolves the sugar-ammonia compounds in large quantities, whereas the sugar itself is practically insoluble therein.

As solvents for the present process there may be used, for example, methanol, ethanol, propanol, isopropanol, butanols, amyl alcohols, glycol, propane-diols, butane-diols, and also acetone, methyl ethyl ketone or diethyl ketone. The solvents are therefore monohydric or dihydric alcohols and/or ketones containing up to 5 carbon atoms. There may also be used formamide, monomethyl-formamide or dimethyl-formamide, or a mixture of two or more of the aforesaid solvents. By using mixtures it is possible to vary as desired the solubility of the sugar-ammonia compounds in the mixture of ammonia extract and solvent.

There may also be incorporated with the aforesaid solvents for varying the solvent properties, hydrocarbons, such as benzene or toluene, or ethers such as tetrahydro-furane.

In carrying out the process the same solvent or different solvents may be used at various stages. For example, the viscous extract may be diluted with methanol in the first stage and, after removing the non-sugar substances of high molecular weight, the sugar-ammonia compounds may be precipitated with isopropanol.

It has also been found that the sugar can be precipitated from the mixture of the ammonia extract and solvent easily and practically completely, if the concentration of ammonia in the mixture is less than about 8 percent. This concentration can be attained in various ways, for example, by heating the solution above 45° C. or by diluting it or evaporating ammonia therefrom, for example, drawing air through the solution, or by a combination of these or other methods. In this manner the ammonia-sugar compounds are rendered unstable or their stability is reduced, and the sugar separates out in an amount corresponding to its solubility in the solvent or solvent mixture added to the extract. Accordingly, it is preferable to use in the present process a solvent or solvent mixture having as low a solvent power for sugar as possible.

It is also of advantage to choose a solvent or solvent mixture which promotes a slow separation of the sugar and so induces the formation of large crystals. For this purpose there is suitable, for example, glycol or water. As, however, the presence of water in the solvent or solvent mixture, which may be introduced by moisture present in the product subjected to extraction, always increases the solubility of sugar in the solvent, it is preferable to add only a small amount of water, if it is not intended to dispense entirely with the addition of water. The composition of the solvent or solvent mixture may, if desired, also be chosen with a view to facilitating, during the recovery of the solvent, the separation of the water taken up from the sugar extract. To this end, for example, a solvent may be chosen which forms an azeotropic mixture with water. After distilling off a part of the solvent together with the water, a practically anhydrous solvent remains behind which has a desirably low or reduced solvent power for sugar.

Ammonia taken up from the extract by the solvent and remaining in the solvent after separation of the greater part of the sugar increases to a small extent the solvent power of the solvent for sugar. This increased solvent power can, when necessary, be successfully prevented or removed by evaporating the ammonia and/or by adding to the solvent or the extract an agent capable of binding ammonia or preventing undesired side reactions or colour formation. Such agents are, for example, carbon dioxide, or sulphurous acid and/or formaldehyde or the like, and a proportion thereof up to 2 percent on the weight of the sugar is sufficient.

The process of this invention has the great advantage from the point of view of economy that the natural products or sugar concentrates to be treated need not be completely dried. This is especially advantageous in the case of sugar-beet chips, since the removal of the last traces of moisture from this material is a very costly operation and is prejudicial to the maintenance of the original quality of the sugar.

The process of the invention has a wide range of application. Even when it is desired to use the process for recovering sugar from dried sugar-containing natural products, especially sugar-beet chips, it can be successfully used as a simple and inexpensive method, for example, for recovering the residual sugar in the residues obtained by the recovery of sugar by means of liquid ammonia in accordance with the present process, by retreating such residues in accordance with the present process. The process is also very suitable for recovering the sugar still present in molasses, which has been obtained by the conventional method of recovering sugar by extraction with water.

Preferably, in treating the residues from either of these different methods of recovery, the material should be as free as possible from water, in order to preclude any undesired influence of the water on the added solvent. When sugar-containing solutions or concentrates, which are advantageously as free as possible from water, are used as starting materials in the present process, the solution or concentrate is stirred with liquid ammonia and the mixture so obtained is then worked up in the manner described above.

A process has been described for recovering sugar from sugar-containing materials by means of a mixture of alcohol and ammonia, especially methanol saturated with ammonia gas. As compared with that process, the process of this invention, which enables a sugar-containing concentrate which is substantially anhydrous, first to be treated or taken up with liquid ammonia and, after filtering the mixture, treating it by the present process to obtain sugar of good purity, has the very considerable advantage that the specific and selective solvent power of liquid ammonia for sugar in preference to its non-sugar accompanying substances is considerably greater than that of ammonia dissolved in an alcohol. By extracting sugar from sugar-containing materials by means of liquid ammonia advantage is taken of the very specific solvent power of liquid ammonia, the solvent power of which differs considerably from that of water and alcohols etc., for separating the non-sugar substances and removing these undissolved constituents, for example, by simple filtration or centrifuging. When the clear filtrate is subsequently diluted with a solvent or solvent mixture in accordance with the invention, the precipitation of substances which are soluble in ammonia but not soluble in the added solvent, takes place readily. Accordingly, the present process, by utilising differing solvent capacities, provides an easy and inexpensive method of separating the accompanying substances from the sugar and purifying the latter.

For the reasons mentioned above the present process is suitable for obtaining pure sugar from raw sugar obtained from a conventional method of recovery. The stability of solutions of sugar, for example, in methanol containing up to about 8 percent of ammonia, enables these solutions to be treated with absorbents, for example, active carbon or a similar surface-active substance, for removing residual accompanying substances and colouring matter.

The method of extracting with ammonia, as compared with the conventional method of extracting sugar-beet chips with water, has the advantage that the treatment of the sugar-beet chips to recover sugar therefrom need not be carried out at the time the crop is harvested. Thus, the present process can be used for the treatment of dried starting materials, for example, dried sugar-beet chips, which can be treated at any time of the year. Consequently, the capacity of a sugar factory using dried sugar-beet chips can be utilised throughout the year. Furthermore, in contradistinction to the aforesaid known process, the energy requirements of the present process are small, so that it is very economical, notwithstanding the drying operation to which the chips are subjected.

The following examples illustrate the invention; but they are not intended to limit it thereto:

*Example 1*

5.88 kilograms of sugar-beet chips having a moisture content of 5.4 percent and a saccharose content of 68 percent (calculated on the dried substance) are treated in an autoclave of 50-litre capacity with 18 kilograms of liquid ammonia, and the extract is filtered into a receiver. In this receiver the ammonia is evaporated by slowly heating the mixture, is again liquified by means of a compressor and by cooling, and returned to the autoclave in a cyclic process. After about 1 hour the extraction is finished. The hard sugar-beet chips swell rapidly after the addition of the liquid ammonia to form an easily stirrable mass. The sugar present in the chips dissolves rapidly and uniformly, so that the ammonia subsequently added has only a washing effect. The extracted pulp, after driving off the ammonia, contains only 1.2 percent of saccharose, which constitutes 0.4 percent of the total sugar.

The greater part of the liquid ammonia is evaporated from the extract collected in the receiver until the extract contains a quantity of ammonia approximately equal to that of the sugar and filtered. It is then mixed with about an equal to double quantity of methanol. The extract so diluted is then heated and a further quantity of ammonia is driven off. At a temperature of about 50° C., which corresponds approximately to a content of 8 percent of ammonia in the solution, the greater part of the saccharose amounting to 3545 grams precipitates out and is separated. It contains 99.2 percent of saccharose, 0.04 percent of nitrogen, 0.07 percent of invert sugar, and 0.1 percent of sulphate ash.

The residual solution is then mixed with about one-fifth of its volume of toluene and the mixture is evaporated. The water derived from the dried chips is removed with the methanol-toluene mixture that distills off, and if desired, after the addition of a further small quantity of methanol, a residual amount of sugar is obtained. The total yield of sugar is 97 percent.

Example 2

An extract obtained in an analogous manner is freed from about one-half of its content of liquid ammonia. It is then mixed with a small quantity of methanol and filtered. The clear filtrate is then moved with approximately twice its weight of isopropanol, whereupon a sugar-ammonia compound having a very viscous consistency separates out. After removing the liquor that remains and washing the separated mass with a small quantity of isopropanol, and again removing the latter, the mass is heated to about 100° C., whereby ammonia is driven off vigorously and an almost pure sugar remains behind in a yield of about 90 percent.

Example 3

Ordinary molasses, which has been previously freed from the greater part of its water content, is stirred with liquid ammonia, and the resulting sugar solution is filtered well to remove undissolved constituents. The ammonia content of the solution is then reduced to about 30% by evaporating ammonia therefrom and the residue is mixed with about three times its weight of methanol. The resulting solution, which has become very turbid due to the addition of the solvent, is then thoroughly clarified and purified over active carbon. By heating the solution to a temperature between about 50° C. and the boiling point of the methanol, about 93 percent of the sugar precipitates out, provided that the molasses has previously been thoroughly freed from water.

In an analogous manner, the sugar can be practically completely recovered in a purity of 97 percent from the mother liquors resulting from the process of this invention, provided that the liquors are first evaporated to complete dryness in vacuo.

We claim:

1. The process of recovering sugar from substantially dry sugar-containing substances contaminated with high molecular contaminants which comprises the step of extracting the sugar-containing substance with liquid ammonia, admixing an organic solvent with resulting liquid extract in proportions precipitating high molecular contaminants, separating high molecular contaminants, adjusting the precipitant-free ammonia-solvent admixture by increasing the ratio of solvent to ammonia to produce a solution of ammonia in solvent, and recovering resulting precipitated sugar, said admixed solvent and solvent present in the ammonia-solvent solution containing at most five carbon atoms and being selected from the group consisting of monohydric alcohols, dihydric alcohols, ketones, formamide, methyl formamide, dimethyl formamide, mixtures of said solvents, and at least one of said solvents in admixture with an aromatic hydrocarbon.

2. The process of claim 1 wherein the precipitant-free ammonia-solvent admixture is adjusted to produce a solution of ammonia in solvent by the step of removing ammonia therefrom.

3. The process of claim 1 wherein the precipitant-free ammonia-solvent admixture is adjusted to produce a solution of ammonia in solvent by the step of adding additional solvent.

4. The process of claim 1 wherein the ammonia-solvent solution contains less than about 8% by weight ammonia in solution.

5. The process of claim 1 wherein the sugar is precipitated as a sugar-ammonia compound and ammonia is removed by heating.

6. The process of claim 1 wherein the admixed solvent is methanol.

7. The process of claim 1 wherein up to 2% by weight of an agent is added to the precipitant-free ammonia-solvent admixture, said agent being selected from the group consisting of carbon dioxide, sulfur dioxide, formamide and mixtures thereof and the amount added being based on the weight of the sugar present in solution.

References Cited in the file of this patent

UNITED STATES PATENTS

| | | |
|---|---|---|
| 2,022,093 | Reich | Nov. 26, 1935 |
| 2,022,824 | Reich | Dec. 3, 1935 |
| 2,031,670 | Reich | Feb. 25, 1936 |
| 2,109,503 | Reich | Mar. 1, 1938 |
| 2,130,029 | Reich | Sept. 13, 1938 |
| 2,465,347 | Boehm | Mar. 29, 1949 |
| 2,501,914 | Payne | Mar. 28, 1950 |

FOREIGN PATENTS

| | | |
|---|---|---|
| 701,366 | Great Britain | Dec. 23, 1953 |
| 49,217 | France | Sept. 6, 1938 |
| 596,091 | Germany | Apr. 26, 1934 |

OTHER REFERENCES

Int. Sugar Journal, January 1953, p. 17.